United States Patent [19]

Siemionko

[11] 4,359,569

[45] Nov. 16, 1982

[54] AROMATIC POLYESTER AND FILAMENTS

[75] Inventor: Roger K. Siemionko, Newark, Del.

[73] Assignee: E. I. Du Pont de Nemours and Company, Wilmington, Del.

[21] Appl. No.: 280,129

[22] Filed: Jul. 2, 1981

Related U.S. Application Data

[63] Continuation-in-part of Ser. No. 198,206, Oct. 17, 1980, abandoned.

[51] Int. Cl.$^3$ .............................................. C08G 63/60
[52] U.S. Cl. .................................. 528/190; 528/193; 528/194; 528/271
[58] Field of Search ................. 528/190, 193, 194, 271

[56] References Cited

U.S. PATENT DOCUMENTS

| | | | |
|---|---|---|---|
| 4,083,829 | 4/1978 | Calundann et al. | 528/194 |
| 4,201,856 | 5/1980 | Jackson, Jr. et al. | 528/194 |
| 4,256,624 | 3/1981 | Calundann | 528/190 |

*Primary Examiner*—Lester L. Lee

[57] ABSTRACT

Fiber-forming aromatic polyester consisting essentially of 6-oxy-2-naphthoyl units, and units derived from certain dihydric phenols, and aromatic dicarboxylic acids.

6 Claims, No Drawings

AROMATIC POLYESTER AND FILAMENTS

CROSS-REFERENCE TO RELATED APPLICATION

This application is a continuation-in-part of my co-pending application Ser. No. 198,206, filed Oct. 17, 1980 and now abandoned.

BACKGROUND OF THE INVENTION

1. Field of the Invention

This invention relates to fiber-forming melt-spinnable aromatic polyesters and to filaments thereof having high tenacity and modulus.

2. Description of the Prior Art

Aromatic polyesters that form anisotropic melts which can be melt spun into high modulus filaments capable of being heat-treated to high tenacities and modulus have been disclosed in prior art patents such as U.S. Pat. No. 4,118,372. Some aromatic polyesters are intractable and cannot be melt spun using conventional technology. The polyester from hydroquinone and terephthalic acids is in the latter category. Since hydroquinone, resorcinol, isophthalic and terephthalic acids are commercially available and reasonably priced it would be of great advantage if polyesters derived in major part from these reactants were capable of forming optically anisotropic melts which could be melt-spun into high modulus filaments.

6-Hydroxy-2-naphthoic acid is shown in U.S. Pat. No. 4,161,470 as a comonomer with 4-hydroxybenzoic acid. It has now been found that small amounts of 6-hydroxy-2-naphthoic acid or a functional derivative thereof may be copolymerized with terephthalic acid and hydroquinone or a functional derivative thereof and either isophthalic acid or resorcinol or a functional derivative thereof to produce polyesters suitable for melt spinning without undue degradation. The melts of these polyesters are optically anisotropic, homogeneous and amenable to processing. Moreover, the filaments from these new polyesters exhibit high modulus and/or high tenacity upon heat treatment.

SUMMARY OF THE INVENTION

The present invention is directed to melt-spinnable polyesters of fiber-forming molecular weight consisting essentially of units having the structural formulas:

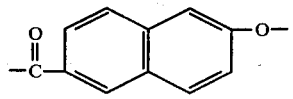

I

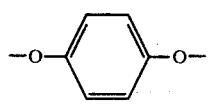

II

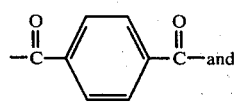

III

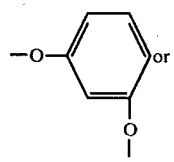

IV

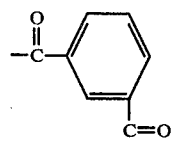

V in the proportions of about 20 to 30 mol % of unit I, about 20 to 40 mol % of unit II, about 20 to 40 mol % of unit III and from 5 to about 20 mol % of units IV or V. The molar proportions of dioxy and dicarbonyl units of the polyester are substantially equal.

Melt-spun and heat strengthened filaments of such polyesters are included in the invention.

DETAILED DESCRIPTION OF THE INVENTION

The copolyesters of the invention consist essentially of units as described above. Unit I, 6-oxy-2-naphthoyl is normally obtained from 6-hydroxy-2-naphthoic acid or from its monoacetate and units III, terephthaloyl, and V, isophthaloyl, from terephthalic and isophthalic acids respectively. Units II, 1,4-dioxyphenylene, and Units IV, 1,3-dioxyphenylene, are derived from hydroquinone and resorcinol, respectively, or from their diacetates.

The precursor reactants are generally combined for the polymerization in proportions corresponding to the molar proportions of units desired in the copolyester product except that for ease of reaction, the diacetate of the dihydric phenols is preferably provided in excess of that found in the copolyester by up to 7 mol %. Mol % of a unit is based on the total mols of units present. In the polyesters of the invention, there are present about 20 to 30 mol % of unit I, about 20 to 40 mol % of unit II, about 20 to 40 mol % of unit III and from 5 to about 20 mol % of units IV or V. In each case the number of dioxy units in the polyester is substantially equal to the number of dicarbonyl units.

Conventional polymerization techniques may be employed such as described in the aforementioned U.S. Patent 4,118,372 and more particularly in the examples described below. In general, a mixture of monomers is heated with stirring, under nitrogen, in a 250 ml 3-necked flask in a Wood's metal bath from approximately 250° C. to 330°-380° C. Polymerization is continued for 0.5 to one hour or longer if necessary until a polymer of fiber-forming molecular weight is obtained. Heating is discontinued prior to development of excessive melt viscosity. Usually a vacuum is applied to obtain a final product with high molecular weight. The copolyesters of the invention exhibit optical anisotropy in the melt as described in U.S. Pat. No. 4,118,372.

Filament Preparation

The copolyesters may be spun into filaments by conventional melt-spinning techniques. In the examples below filaments were prepared by melt-spinning into a quenching atmosphere of air or nitrogen and collected at a windup speed specified in the examples. The spinneret employed had 1 capillary, shaped as a right circular cylinder 0.23 mm in diameter and 0.46 to 0.69 mm long. "Melt temperature" is the temperature at which the melt was maintained (values in parentheses are temperatures of the spinnerets).

As used herein, the term "as-spun fiber" refers to a fiber which has not been drawn or heat treated after extrusion and normal windup.

Heat Treatment and Utility

Following collection, samples of undrawn (as-spun) monofilament were heat-treated in relaxed condition in an oven. Heating was staged in a nitrogen-purged atmosphere. Typically, temperature was raised to 200° C. in 2 hrs, then to 304° C. in another 7 hrs, and finally maintained at 304° C. for an additional 7 hrs. Such a heating sequence is abbreviated as RT-200° C./2 hr+200°-304° C./7 hr+304° C./7 hr.

The heat-treated fibers of this invention are useful for a variety of industrial applications such as in ropes and cables and in reinforcement of plastic composites and of rubber in tires and V-belts.

Measurements

The polymers were characterized by "stick temperature" meaning the temperature of a thermal-gradient hot bar at the point at which the polymer first began to stick as the polymer was pressed against the bar at progressively higher temperature.

Filament tensile properties were measured using a recording stress-strain analyzer at 70° F. (21.1° C.) and 65% relative humidity. Sample lengths were 1.0 in (2.54 cm), and rate of elongation was 10%/min. Results are reported as D/T/E/M or T/E/M where D is linear density in tex units, T is break tenacity in dN/tex, E is elongation-at-break expressed as the percentage by which initial length increased, and M is initial tensile modulus in dN/tex. Since linear density is normally substantially unchanged by heat-treatment, it is reported only for as-spun filaments.

Fibers of this invention have high heat-treated tenacities and/or high initial moduli. Preferably they have tenacities of 10 dN/tex or greater and/or moduli of 200 dN/tex or greater. Average tensile properties are reported in the examples. In some cases the maximum single tenacity value is also listed.

EXAMPLES

The same general procedure was used in all the examples. It should be understood that the results reported below are believed to be representative and do not constitute all the experiments involving the indicated reactants. Where inferior results were obtained, they were attributed to unfamilarity with the reaction requirements of the system, to impure reactants, or to inadequate or excessive fiber heat treatment.

The reactants used in the examples are coded as follows:

| | |
|---|---|
| 2,6-HNA | - 6-hydroxy-2-naphthoic acid monoacetate |
| HQ | - hydroquinone diacetate |
| RQ | - resorcinol diacetate |
| TPA | - terephthalic acid |
| IA | - isophthalic acid. |

The monomer ingredients were added to a 3-necked flask in substantially the same molar ratios as desired in the final polymer except that an excess (usually up to 7 mol %) of acetylated dihydric phenol was generally used. The resultant polymer is identified, for example, as 2,6HNA/HQ/TPA/IA (25/37.5/27.5/10)

meaning it was prepared from 25 mol % of the monoacetate of 6-hydroxy-2-naphthoic acid, 37.5 mol % of hydroquinone diacetate, 27.5 mol % of terephthalic acid and 10% of isophthalic acid (excesses of diacetates are not included in these percentages).

The 3-necked flask was fitted with (1) a glass stirrer extending through a pressure-tight resin bushing, (2) a nitrogen inlet, and (3) a short Vigreux column leading to a water-cooled condenser with a flask for collecting acetic acid by-product. An attachment for application of vacuum was provided at the end of the condenser. An electrically heated Wood's metal bath mounted for vertical adjustment was used for heating. The reaction mixture was heated to increasing temperatures with stirring at atmospheric pressure under nitrogen purge until essentially all the acetic acid had evolved. Then heating was continued under vacuum at a pressure less than about 133 Pa, preferably about 27 Pa, until viscosity had increased to a level believed satisfactory for melt-spinning. The cooled and solidified polymer was comminuted, and a portion was molded into a cylindrical plug for melt-spinning.

EXAMPLE 1

Filaments From Copolyesters of 2,6-HNA, HQ, TPA AND IA

| | Polymerization Ingredients | | | | |
|---|---|---|---|---|---|
| | Grams | | | | Mole Ratios |
| Ex. | 2,6HNA | HQ | TPA | IA | 2,6HNA/HQ/TPA/IA |
| 1A | 6.9 | 12.46(7%)* | 4.98 | 4.98 | 20/40/20/20 |
| 1B | 5.75 | 7.64(5%)* | 4.57 | 1.66 | 25/37.5/27.5/10 |
| 1C | 6.9 | 7.26(7%)* | 4.98 | 0.88 | 30/35/30/5 |

*Percent excess

| | Polymerization Temperatures | |
|---|---|---|
| Ex. | Atmospheric Pressure | Vacuum |
| 1A | 270–350° C./65 min. | 350° C./2 min. |
| 1B | 280–350° C./32 min. | 350° C./18 min. |
| 1C | 280–350° C./50 min. | 350° C./15 min. |

| | Polymer Characterization |
|---|---|
| Ex. | Stick Temperature (°C.) |
| 1A | 270 |
| 1B | 290 |
| 1C | 280 |

| | Filament Extrusion | |
|---|---|---|
| | Melt Temp (°C.) | Windup |
| Ex. | Cell (Spinneret) | Speed (m/min) |
| 1A | 335 (342) | 549 |
| 1B | 350 (360) | 549 |
| 1C | 346 (350) | 549 |

| | Heat Treatment |
|---|---|
| Run | Cycle |
| 1A | RT-200° C./2hr + 200–304° C./7hr + 304° C./7hr |
| 1B | RT-200° C./2hr + 200–304° C./7hr + 304° C./7hr |
| 1C | RT-200° C./2hr + 200–308° C./7hr + 304° C./7hr |

| Tensile Properties |
|---|

-continued

Filaments From Copolyesters of 2,6-HNA, HQ, TPA AND IA

| Ex. | As-spun D/T/E/M | Heat Treated T/E/M |
| --- | --- | --- |
| 1A | 1.0/2.4/2.0/178 | 14.5/8.0/182 |
| 1B | 0.70/3.6/1.3/267 | 12.5/3.9/295 |
| 1C | 0.77/4.0/1.2/346 | 13.4/3.4/359 |

EXAMPLE 2

Filaments From Copolyesters of 2,6HNA, HQ, RQ and TPA

Polymerization Ingredients

| Grams | | | | Mol % |
| --- | --- | --- | --- | --- |
| 2,6HNA | HQ | RQ | TPA | 2,6HNA/HQ/RQ/TPA |
| 4.14 | 3.66(5%) | 0.61(5%)* | 3.48 | 30/30/5/35 |

*Percent excess

Polymerization Temperatures

| Atmospheric Pressure | Vacuum |
| --- | --- |
| 270–360° C./33 min. | 360–370° C./10 min. |

Polymer Characterization

| Stick Temperature (°C.) |
| --- |
| 240 |

Filament Extrusion

| Melt Temp (°C.) Cell (Spinneret) | Windup Speed (m/min) |
| --- | --- |
| 305 (310) | 549 |

Heat Treatment Cycle

| RT-230° C./2hr + 250° C./2hr + 270° C./2hr + 290° C./10hr |
| --- |

Tensile Properties

| As-spun D/T/E/M | Heat Treated T/E/M | Maximum T |
| --- | --- | --- |
| 0.67/3.1/0.9/347 | 9.8/3.3/319 | 11.62 |

I claim:

1. Melt-spinnable polyesters of fiber-forming molecular weight consisting essentially of units having the structural formulas:

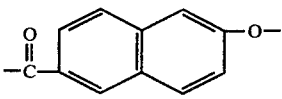 I

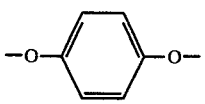 II

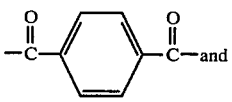 III

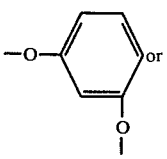 IV

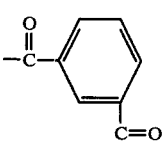 V in the proportions of about 20 to 30 mol % of unit I, about 20 to 40 mol % of unit II, about 20 to 40 mol % of unit III and from 5 to about 20 mol % of units IV or V, the dioxy and dicarbonyl units being present in substantially equimolar amounts.

2. Filaments of the polyester of claim 1.

3. Polyester according to claim 1 consisting essentially of units I, II, III and IV.

4. Filaments of the polyester of claim 3.

5. Polyester according to claim 1 consisting essentially of units I, II, III and V.

6. Filaments of the polyester of claim 5.

* * * * *